US012636668B2

(12) United States Patent
Vanzetto et al.

(10) Patent No.: US 12,636,668 B2
(45) Date of Patent: May 26, 2026

(54) SUPPLY DEVICE FOR A SPRAYER, MODULES FOR SUCH A SUPPLY DEVICE, AND APPLICATION FACILITY OF A COATING PRODUCT COMPRISING SUCH A SUPPLY DEVICE

(71) Applicant: EXEL INDUSTRIES, Epernay (FR)

(72) Inventors: Denis Vanzetto, Epernay (FR); Joseph Tarantini, Epernay (FR)

(73) Assignee: EXEL INDUSTRIES, Epernay (FR)

( * ) Notice: Subject to any disclaimer, the term of this patent is extended or adjusted under 35 U.S.C. 154(b) by 447 days.

(21) Appl. No.: 18/171,349

(22) Filed: Feb. 18, 2023

(65) Prior Publication Data

US 2023/0264219 A1 Aug. 24, 2023

(30) Foreign Application Priority Data

Feb. 24, 2022 (FR) ...................................... 2201632

(51) Int. Cl.
*B05B 12/14* (2006.01)
*B05B 13/04* (2006.01)
*B05B 15/652* (2018.01)

(52) U.S. Cl.
CPC ........ *B05B 12/149* (2013.01); *B05B 13/0431* (2013.01); *B05B 15/652* (2018.02)

(58) Field of Classification Search
USPC .................. 118/321, 323, 300; 134/172, 198
See application file for complete search history.

(56) References Cited

U.S. PATENT DOCUMENTS 4,846,226 A 7/1989 Merritt
6,234,405 B1 5/2001 Yoshida et al.
8,333,164 B2 12/2012 Herre et al.
2010/0294856 A1 11/2010 Griesenbruch et al.
2019/0337004 A1 11/2019 Clifford et al.
2019/0337167 A1 11/2019 Clifford et al.

FOREIGN PATENT DOCUMENTS

CN 112105462 A 12/2020
CN 112334235 A 2/2021
EP 1502658 A1 2/2005
(Continued)

OTHER PUBLICATIONS

English Translation JP-06246200-A (Year: 1994).*
(Continued)

*Primary Examiner* — Yewebdar T Tadesse
(74) *Attorney, Agent, or Firm* — Soquel Group LLC

(57) ABSTRACT

A feeding device for feeding coating and/or cleaning agents to a sprayer has an annular structure and includes an annular plate, a plurality of connection modules, a plurality of function modules and a plurality of inlet modules. Each connection module is removably mounted to bear against one side of the annular plate. Each function module is removably mounted on an outer face of a connection module. Each function module is fluidically coupled to the connection module onto which same is mounted. Each inlet module is removably mounted on an inlet face of a connection module. Each inlet module carries fluidic coupling elements accessible on a face of the inlet module, oriented opposite the connection module on the inlet face of which same is mounted.

14 Claims, 14 Drawing Sheets

(56) References Cited

FOREIGN PATENT DOCUMENTS

| | | | | |
|---|---|---|---|---|
| EP | 1543883 | A1 | 6/2005 | |
| EP | 1543883 | B1 | 6/2005 | |
| JP | 06246200 | A * | 9/1994 | |
| JP | 1080650 | A | 3/1998 | |
| WO | WO-0151216 | A2 * | 7/2001 | ........... B05B 12/149 |

OTHER PUBLICATIONS

English Translation WO-0151216A2 (Year: 2001).*
INPI Preliminary Search Report for French Application No. 2201632, Oct. 19, 2022, 2 pages.

* cited by examiner

SUPPLY DEVICE FOR A SPRAYER, MODULES FOR SUCH A SUPPLY DEVICE, AND APPLICATION FACILITY OF A COATING PRODUCT COMPRISING SUCH A SUPPLY DEVICE

REFERENCE TO RELATED APPLICATION

This application is a U.S. non-provisional application claiming the benefit of French Application No. 22 01632, filed on Feb. 24, 2022, the contents of which are incorporated herein by reference in their entirety.

TECHNICAL FIELD OF THE INVENTION

The present invention relates to a device for feeding a sprayer with a coating product and/or a cleaning product. The invention further relates to modules forming spare parts for such a feeding device and to an installation for applying a coating product, which includes a robot, preferentially a multi-axis robot, and a sprayer mounted on an arm of the robot and fed with a coating product and/or a cleaning product by a feeding device.

The technical field of the invention is that of the application of a coating product, in particular, by electrostatic spraying, on objects such as motor vehicle bodies, vehicle or household appliance components and, more generally, any object which is to receive a layer of coating product.

BACKGROUND OF THE INVENTION

In this field, it is known from EP-A-1543883 how to use a valve system to feed a sprayer with a two-component product, the valve system being mounted close to the sprayer.

It is also known from JP-A-6-246200 to fit in, upstream of a sprayer, a set of paint valves arranged in one or a plurality of rows and which feed a manifold on which an air valve and a solvent valve are mounted. The set of paint valves is voluminous, to the point that the set has to be arranged at a distance from the sprayer, with the interposition of a suction pump. Significant losses of paint and solvent result therefrom in the event of a change of color of the sprayed paint.

On the other hand, it is known from EP-A-1502658 to mount a set of valves and a sprayer at the end of a robot arm. Color-changing valves are arranged in juxtaposed units and open out into a rectilinear and central collecting channel, while being distributed around the channel, in adjacent planes. Such construction is difficult to implement, especially when it involves adapting the construction to the number of coating products to be dispensed or to the nature thereof; e.g., single- or two-component. Mounting or dismounting of one valve unit affects positioning of the other valve units. Furthermore, when the valve set is integrated into the end of a robot arm, the set may hinder the passage of pilot air hoses or of power supply electrical cables for the sprayer.

Known equipment includes application-specific valve blocks, which are sometimes designed according to the end-user requirements for an application installation incorporating, among other things, an associated sprayer and feeder. Thereby, many specific blocks have to be designed and manufactured, which is disadvantageous, in particular in terms of cost price and stock management. Furthermore, such different specific blocks require specific maintenance operations, which is economically disadvantageous.

On the other hand, during the lifetime of an application installation, the device supplying the sprayer with a coating product and/or a cleaning product has sometimes to be upgraded so as to take into account an adaptation of the implemented painting method. With known equipment, such an evolution is complex to implement, and time consuming.

SUMMARY OF THE INVENTION

The invention is more particularly intended to overcome such drawbacks by proposing a novel device for feeding a sprayer with a coating product and/or a cleaning product which has improved modularity, to the extent that the device may be easily configured to meet the conditions of use thereof, from standardized elements.

To this end, the invention relates to a device for feeding a sprayer with a coating product and/or a cleaning product, the device including at least one controlled valve, a supply conduit for bringing the product to the valve and at least one conduit for feeding the sprayer from the valve. According to the invention,

- the feeding device has an annular structure and includes
  - an annular plate,
  - a plurality of connection modules,
  - a plurality of function modules and
  - a plurality of inlet modules;
- the plate has through holes;
- each connection module is removably mounted, in contact by means of a contact plate, against one side of the annular plate;
- each connection module comprises at least one conduit for feeding product to at least one pilot-operated valve;
- each function module is removably mounted on an outer face of a connection module distinct from the contact face thereof with the annular plate;
- each function module is fluidically connected to the supply conduit of the connection module on the outer face of which same is mounted;
- each function module includes either at least one pilot-operated valve and at least one conduit or a section of conduit intended for being grounded;
- each inlet module is removably mounted on an inlet face of a connection module which is opposite the contact face thereof; and
- each inlet module carries fluidic coupling elements accessible on a face of the inlet module oriented opposite the connection module on the inlet face of which same is mounted.

By means of the invention, the plate imparts an overall annular shape to the feeding device and supports the different types of modules. The connection modules are used for making a feeding circuit, from the inlet modules, valves and/or the conduits, which belong to the function modules. The inlet modules may be used for an easy connection of the feeding device to the supply pipes for bringing a coating or a cleaning product. The fact that the different modules are removably mounted facilitates maintenance operations and the adaptation of the feeding device to the conditions of use thereof.

According to advantageous but non-mandatory aspects of the invention, such a feeding device may incorporate one or a plurality of the following features, taken individually or according to any technically permissible combination:

- Bodies of all inlet modules, which are equipped with fluidic connection elements, being identical to each other.

At least one inlet module, and preferentially each inlet module, being equipped with a label bearing identification marks for the fluidic coupling components, the label preferentially being affixed onto one face of the inlet module which extends the outer face of the connection module onto the inlet face on which the inlet module is mounted.

At least one function module, preferentially each function module, and/or the plate being equipped with a label for identifying valves, conduits or couplings, the label being removably mounted on a fixed part of the function module or of the plate.

Each connection module carrying at least one function module on the outer face thereof and a single inlet module on the inlet face thereof.

The connection modules together defining an annular structure or a ring portion structure, within which a control circuit extends which runs through each connection module.

The device including parallel bars which support the annular plate and in that each connection module and/or each inlet module rests on a pair of two adjacent parallel bars.

The annular plate being made of an electrically conducting material and each connection module including at least one threaded insert made of an electrically conducting material, each threaded insert being configured for receiving a screw for mounting a connection module onto the annular plate and/or onto an adjacent connection module, a function module onto a connection module or an inlet module onto a connection module, whereas the screws and threaded inserts together form an equipotential track between the connection modules, the function modules, the inlet modules and the annular plate.

The invention further relates to modules forming spare parts for a feeding device such as mentioned hereinabove.

Such a module may be a connection module including a contact face intended to bear, in a removable manner, against one side of the annular plate, an outer face distinct from the contact face and intended for receiving, in a removable manner, at least one function module, and an inlet face opposite the contact face thereof and intended for supporting, in removable manner, an inlet module.

Such a module may also be a function module including at least one pilot-operated valve, at least one internal conduit and means for removably mounting onto an outer face of the connection module.

Such a module may also be an inlet module including a first face intended to bear, in a removable manner, against an inlet face of a connection module and a second face, opposite the first face and through which the inlets of fluidic coupling elements carried by the inlet module are accessible.

According to another aspect, the invention relates to an installation for applying a coating product, which includes a robot, preferentially a multi-axis robot, and a sprayer mounted on an arm of the robot and fed with a coating product and/or a cleaning product by a feeding device such as mentioned hereinabove.

The advantages of such installation are derived from the advantages of the feeding device thereof for a coating and/or a cleaning product.

Advantageously, conduits for supplying control air for pneumatic valves, a connector and/or electrical cables supplying high voltage to the sprayer run through or are housed in a central zone of the feeding device, which is defined by the annular plate.

BRIEF DESCRIPTION OF THE DRAWINGS

The invention will be better understood and other advantages of the invention will appear more clearly in the light of the following description of two embodiments of a feeding device and of an application installation according to the principle thereof, given only as an example and made with reference to the enclosed drawings, wherein:

in FIG. 4, insert A corresponding to a partial section along plane A;

DETAILED DESCRIPTION

Figure 1:
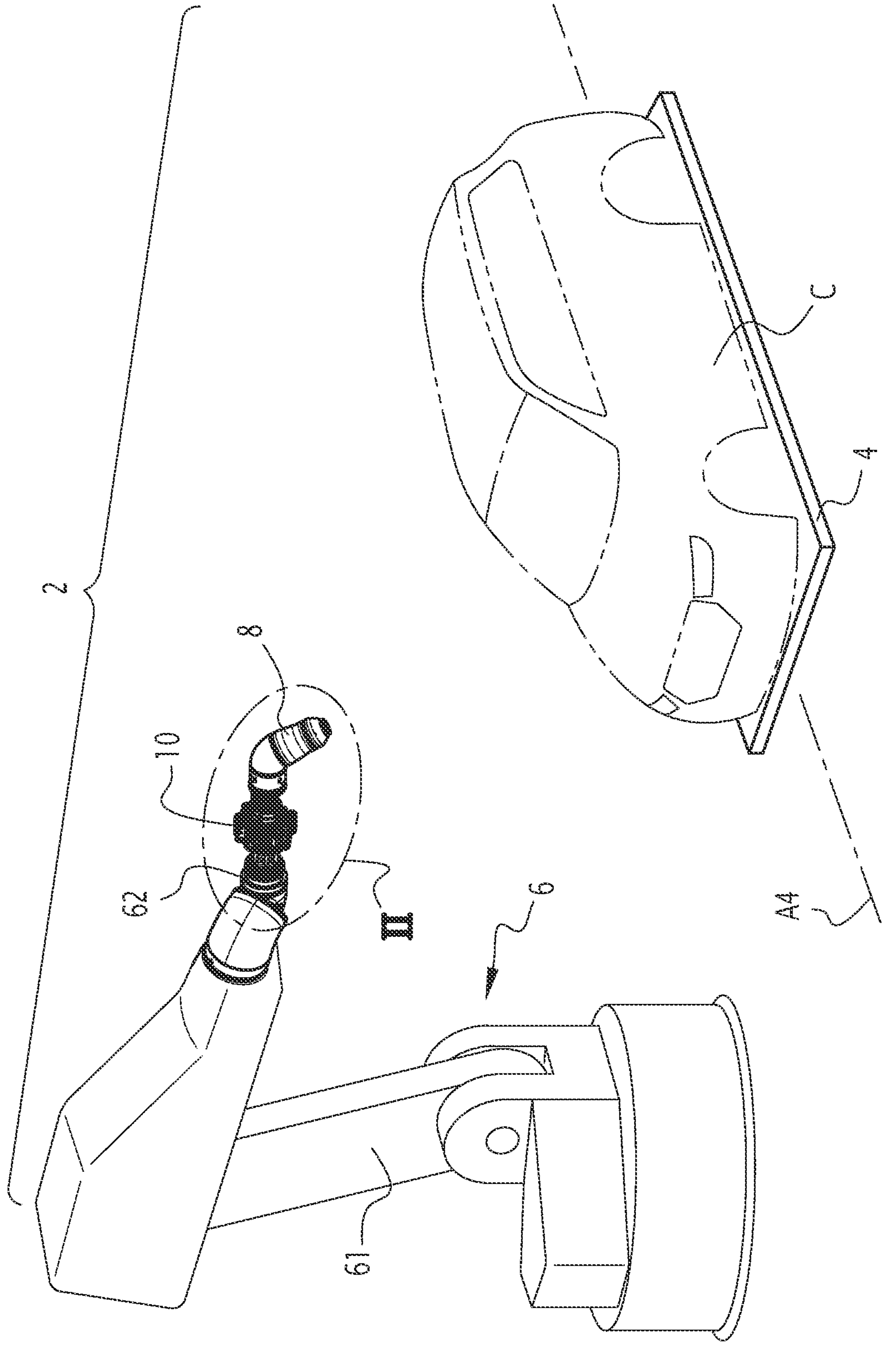
FIG. 1 is a schematic perspective representation of the principle of an installation for applying a coating product according to the invention, incorporating a feeding device according to the invention.
Figure 2:
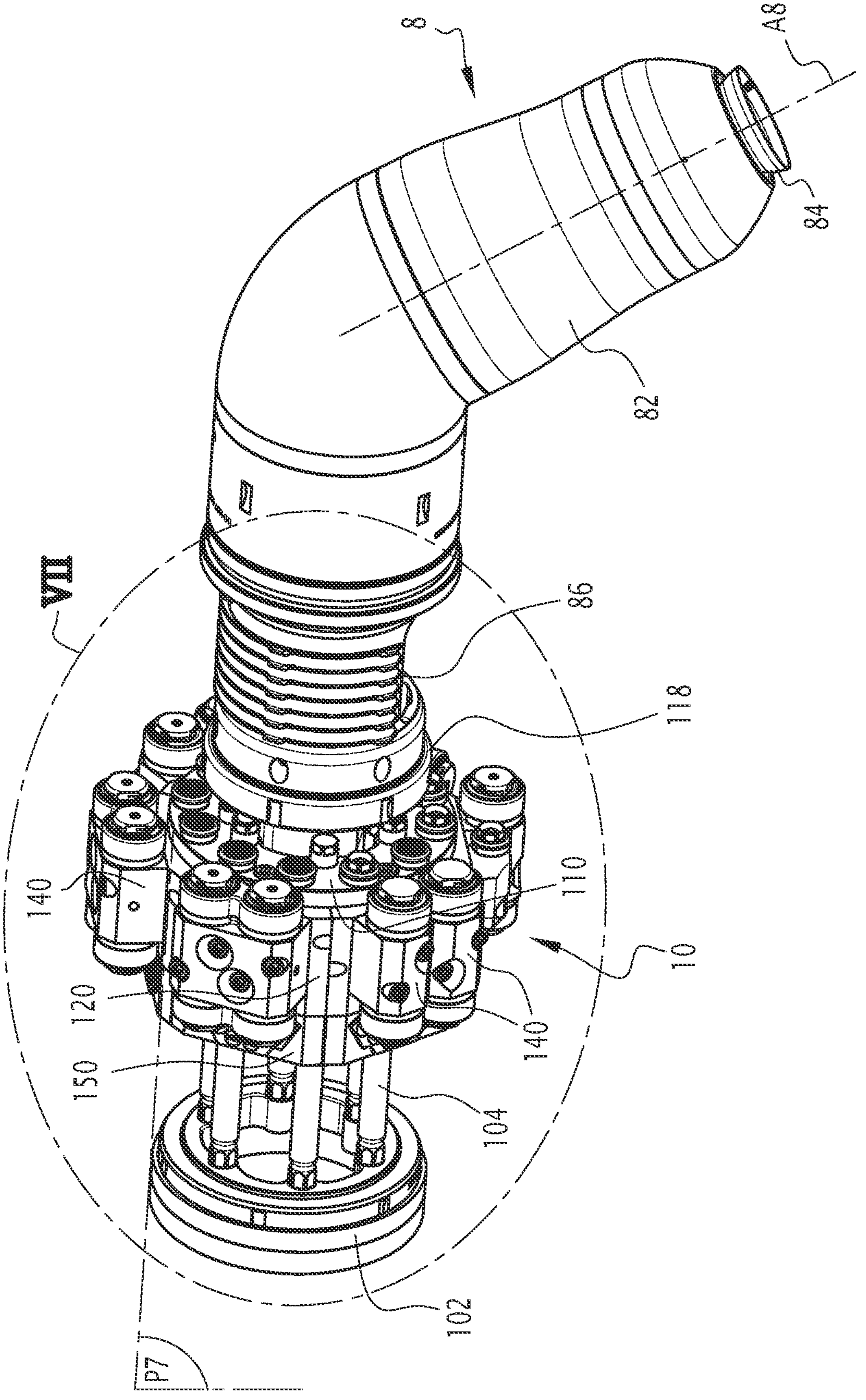
FIG. 2 is a view on a larger scale of detail II shown in FIG. 1.

An installation 2 shown in FIG. 1 is as per the invention and is used for applying a coating product, such as a paint or a varnish, onto a motor vehicle body C moved by a conveyor 4 along a conveying axis A4. Installation 2 includes a plurality of robots, only one of which is shown in FIG. 1 with reference 6. An arm 61 of each robot 6 carries a sprayer 8 for coating product.

In practice, and according to an aspect of the invention which is not shown, robots 6 are distributed along conveying axis A4, on both sides of conveyor 4.

As may be seen in FIG. 1, robot 6 is of the multi-axis robot type. In a variant, the robot may be of another type, in particular of a reciprocator type.

In FIG. 1, objects are not represented on the correct scale. The scale of robot 6 and of sprayer 8 is enlarged compared to the scale of body C.

Sprayer 8 is rotary and includes a body 82 which defines a longitudinal axis A8, and a bowl 84 mounted apt to rotate about the axis A8 and rotated by means of a turbine (not shown), which is advantageously an air turbine.

In the present example, sprayer 8 is electrostatic and is associated with a high-voltage unit 9 which supplies the sprayer with a DC voltage on the order of −60 kV which electrostatically charges the coating product sprayed by bowl 84 which is rotated about axis A8.

Figure 3:
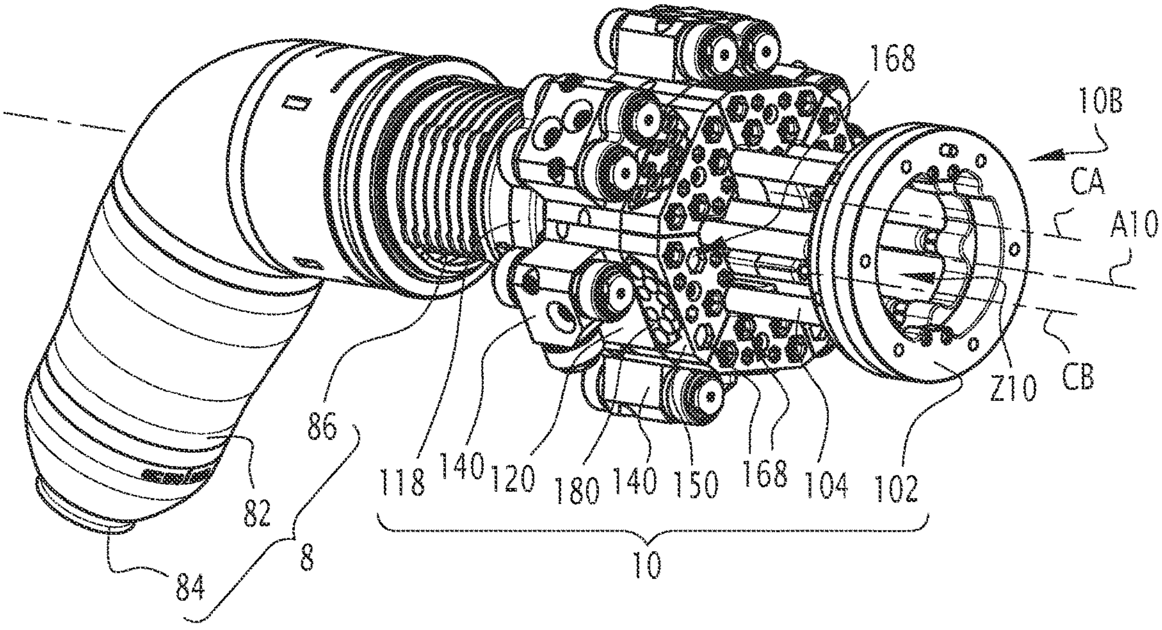
FIG. 3 shows the same part of the installation as the part visible in FIG. 2, in perspective and in cross-section and in perspective, respectively, at two angles which are different from the angle of FIG. 2.
Figure 3:
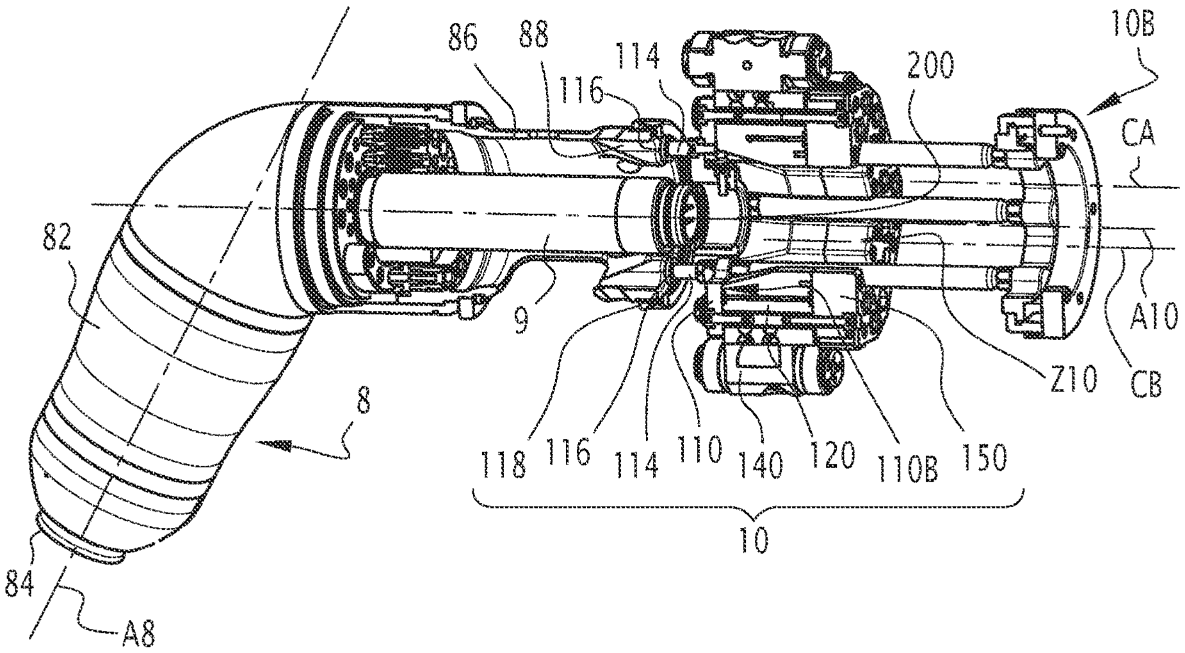

As can be seen in the lower part of FIG. 3, high-voltage unit 9 is housed in a part 86 of sprayer 8, which is arranged, with respect to body 82, opposite bowl 84.

A device 10 for feeding sprayer 8 with a coating product and a cleaning product is interposed between sprayer 8 and a wrist 62 of robot 6 which forms the end of arm 61. Feeding device 10 provides the mechanical interface between wrist 62 and sprayer 8, and feeds the sprayer with coating product and cleaning product.

In particular, feeding device 10 supports sprayer 8 from wrist 62.

10A denotes the front side of feed device 10 which is oriented towards sprayer 8 in the mounted configuration of sprayer 8 on device 10. 10B denotes the rear side of device 10 which is oriented towards robot wrist 62 in the mounted configuration of device 10 on robot 6. Similarly, a side or a front face of a component of feeding device 10, which is oriented towards sprayer 8 in the mounted configuration of sprayer 8 on device 10, bears the same reference as the component plus the letter A, whereas a side or a rear face of such a constituent element, which is oriented towards robot wrist 62 in the mounted configuration of device 10 on robot 6, bears the same reference as the constituent element plus the letter B.

Feed device 10 includes, on rear side 10B thereof, a flange 102 intended for being immobilized on wrist 62 of robot 6 by any appropriate means, in particular by means of an internal thread or screw (not shown).

The flange is circular and centered on an axis A10 which is a longitudinal axis of feed device 10.

In the example of the figures, axes A8 and A10 are not parallel and are secant, which results from the geometry of body 82.

In a variant of the invention (not shown), axes A8 and A10 are parallel.

From flange 102, six tie bolts 104 extend parallel to axis A10, opposite wrist 62, and are each provided with a threaded end 106.

Feeding device 10 further includes an annular plate 110 which is made of an electrically conducting material, such as aluminum, and which forms a frame for feeding device 10. Plate 110 is provided with six through ports 112 each configured for receiving one end 106 of a tie bolt 104. Nuts 114 are screwed onto ends 106 and may be used for immobilizing plate 110 on tie bolts 104. There are six nuts 114, four of which are equipped with a collar 116, which may be used for hooking onto plate 110 a tapped ring 118. Ring 118 may be used for screwing a threaded end piece 88 which forms the end of part 86 of sprayer 8, opposite body 82.

Figure 7:
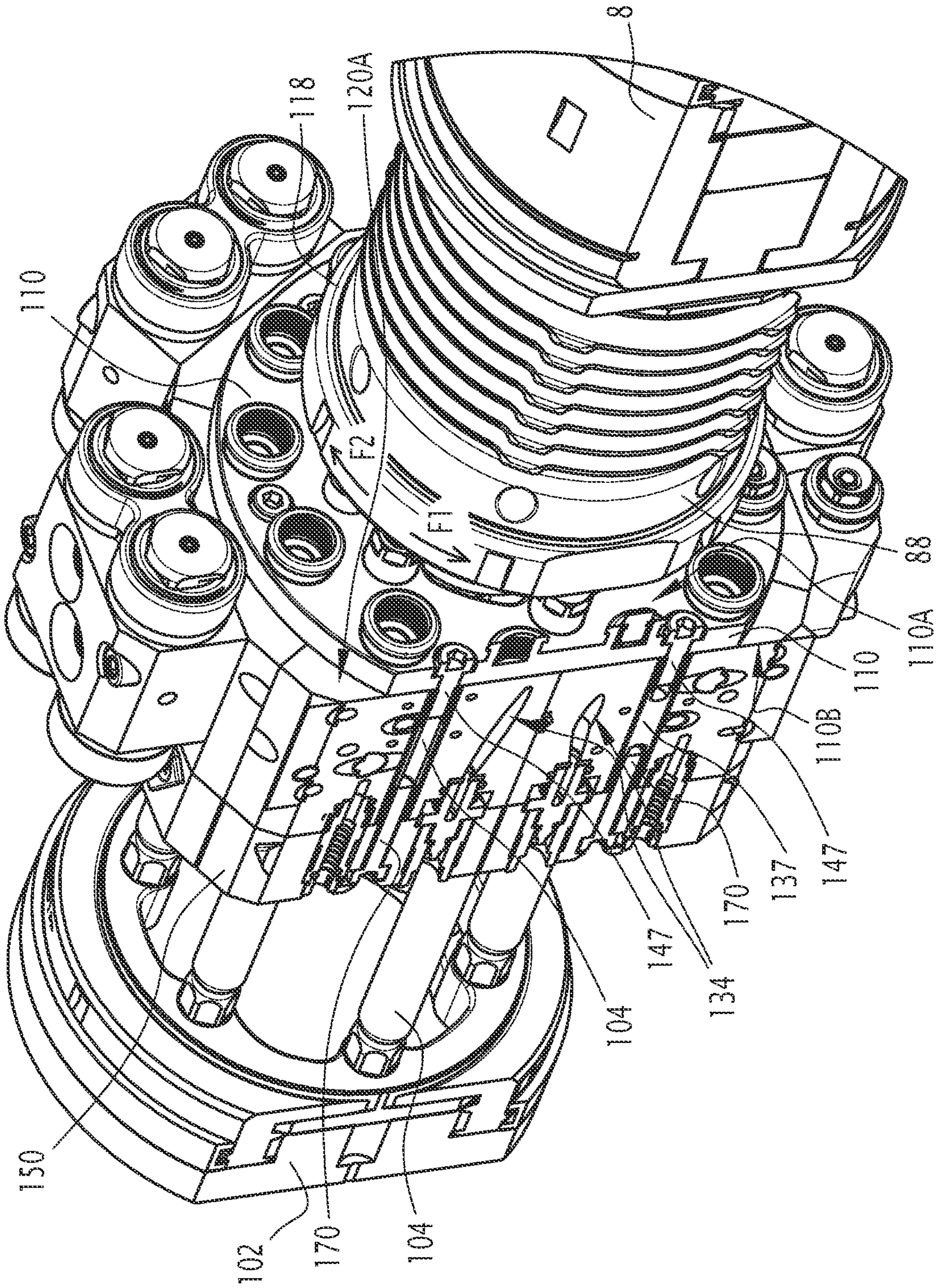
FIG. 7 is a larger scale view of detail VII of FIG. 2, cut along plane P7.

In practice, when it is necessary to mount sprayer 8 on robot 6 equipped with feeding device 10, threaded end piece 88 is aligned on axis A10 and brought close to flange ring 102, then threaded ring 118, which forms a nut with large diameter, is set in rotation in the direction of arrow F1 shown in FIG. 7 so as to be screwed onto threaded end piece 88, until sprayer 8 is immobilized. Conversely, when it is necessary to remove sprayer 8, ring 118 is set in rotation in the direction of arrow F2 in FIG. 7 so that the ring is unscrewed from threaded end-piece 88, before moving sprayer 8 away from feeding device 10, along axis A10.

Figure 12:
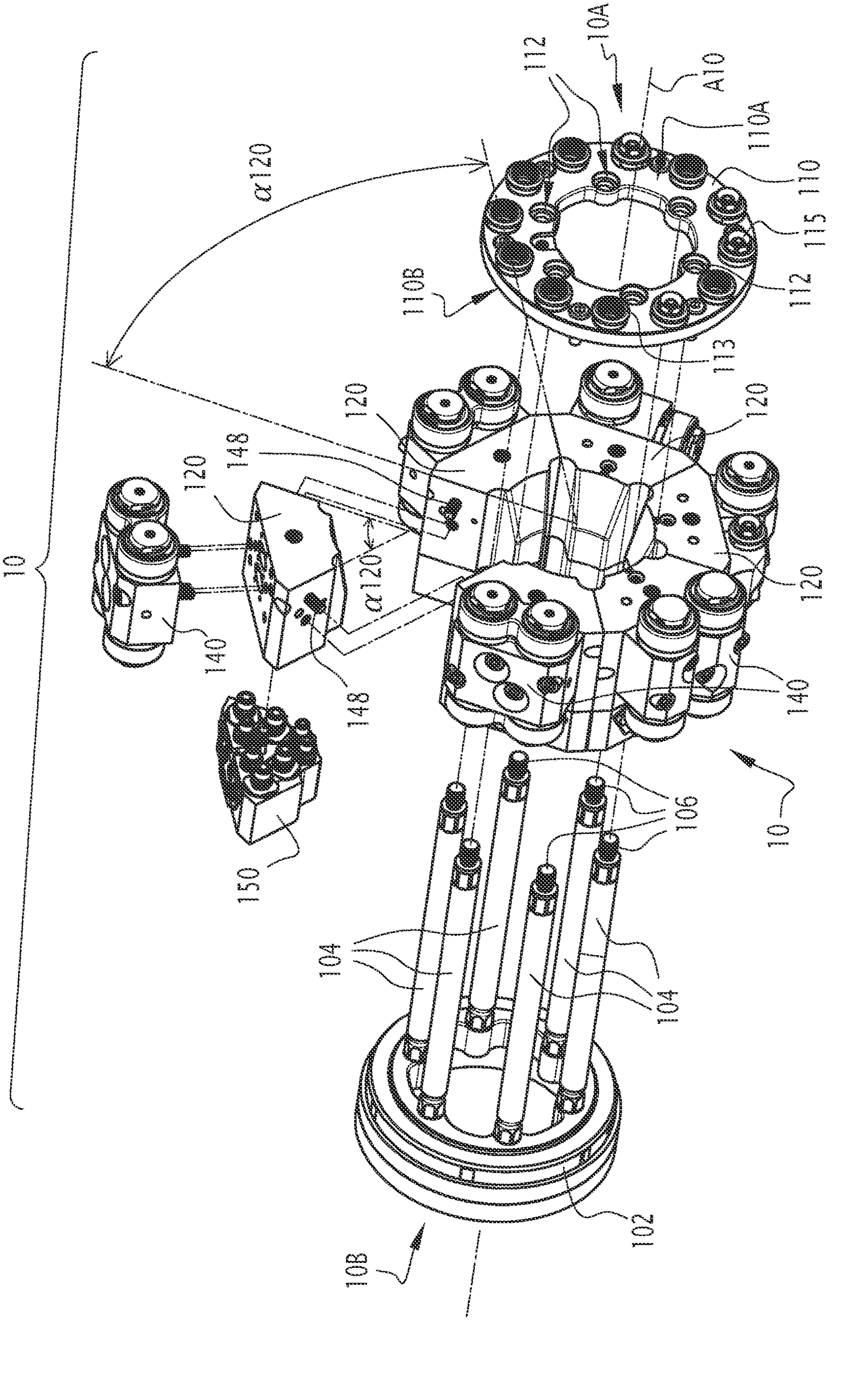
FIG. 12 is a partially exploded perspective view of the device shown in the previous FIGS. 4-6.
Figure 13:
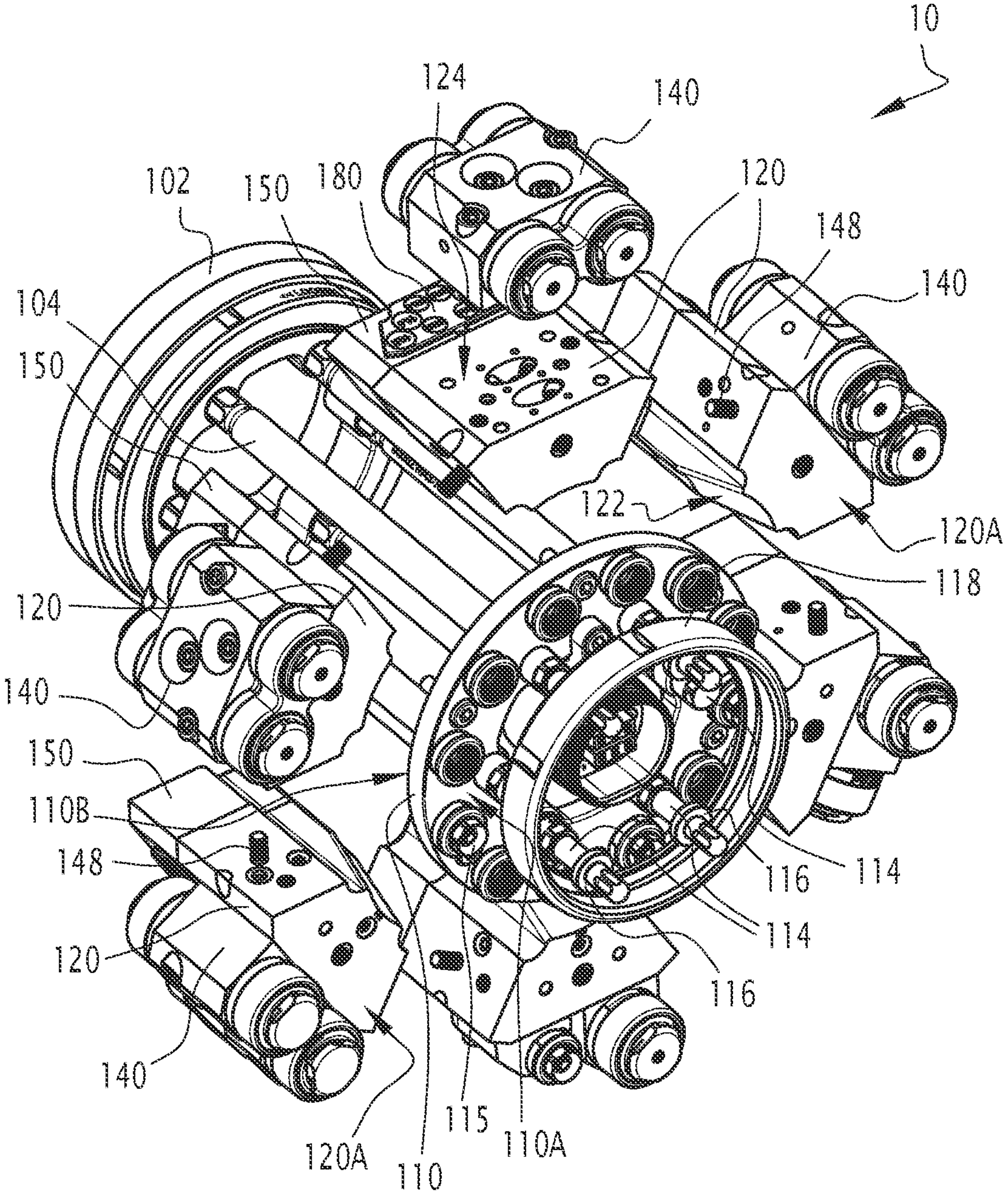
FIG. 13 is another exploded perspective view of the feeding device shown in FIGS. 4-6 and 12, with a different breakdown than that of FIG. 12.

For clarity of the drawing, nuts 114 and ring 118 are not shown in FIG. 12. However, same are visible in FIGS. 1-3, 7 and 13.

Feeding device 10 further includes six connection modules 120. In the example shown in FIGS. 1-13, the six connection modules 120 form together an annular structure which extends all around axis A10.

Each connection module 120 extends over an angular sector the apex angle a120 of which is equal to 60°.

Each connection module 120 has the shape of a cylinder with an overall trapezoidal base and includes an internal face 122 oriented towards axis A10 in the mounted configuration of the module on plate 110, an outer face 124 oriented opposite axis A10 in the mounted configuration of module 120 on plate 110, and two lateral faces 126 and 128 which each extend in a plane radial to axis A10 in the mounted configuration of module 120 on plate 110. Two adjacent modules 120 mounted on plate 110 are in contact via lateral face 126 of one of the modules and lateral face 128 of the other module.

Each module 120 defines two notches 130 and 132 at the junction between internal face 122 thereof and lateral faces 126 and 128 thereof.

Notches 130 and 132 make it possible to place a connection module 120 bearing on two adjacent tie bolts 104, by engaging the portion of module 120 which defines internal face 122 thereof between the two tie bolts 104, from the outside and along the direction of axis A10, along a direction radial to the axis, until notches 130 and 132 partially cap the two tie bolts 104.

It is then possible to slide each module 120 towards rear side 110B of plate 110.

Each connection module 120 includes a front face 120A and a rear face 1206, opposite the front face thereof.

Advantageously, front and rear faces 120A and 120B of a connection module 120 are parallel.

Advantageously, front face 120A of a connection module is perpendicular to internal face 122, outer face 124 and lateral face 126, 118 thereof.

Advantageously, in the assembled configuration of feeding device 10, faces 122, 124, 126 and 128 of a connection module 120 are parallel to longitudinal axis A10, and front face 120A and rear face 120B each extend in a plane radial to the axis.

In the assembled configuration of feeding device 10, each connection module 120 bears via front face 120A against rear side 110B of plate 110. Front face 120A of a module 120 thus forms contact face thereof with annular plate 110.

Figure 10:
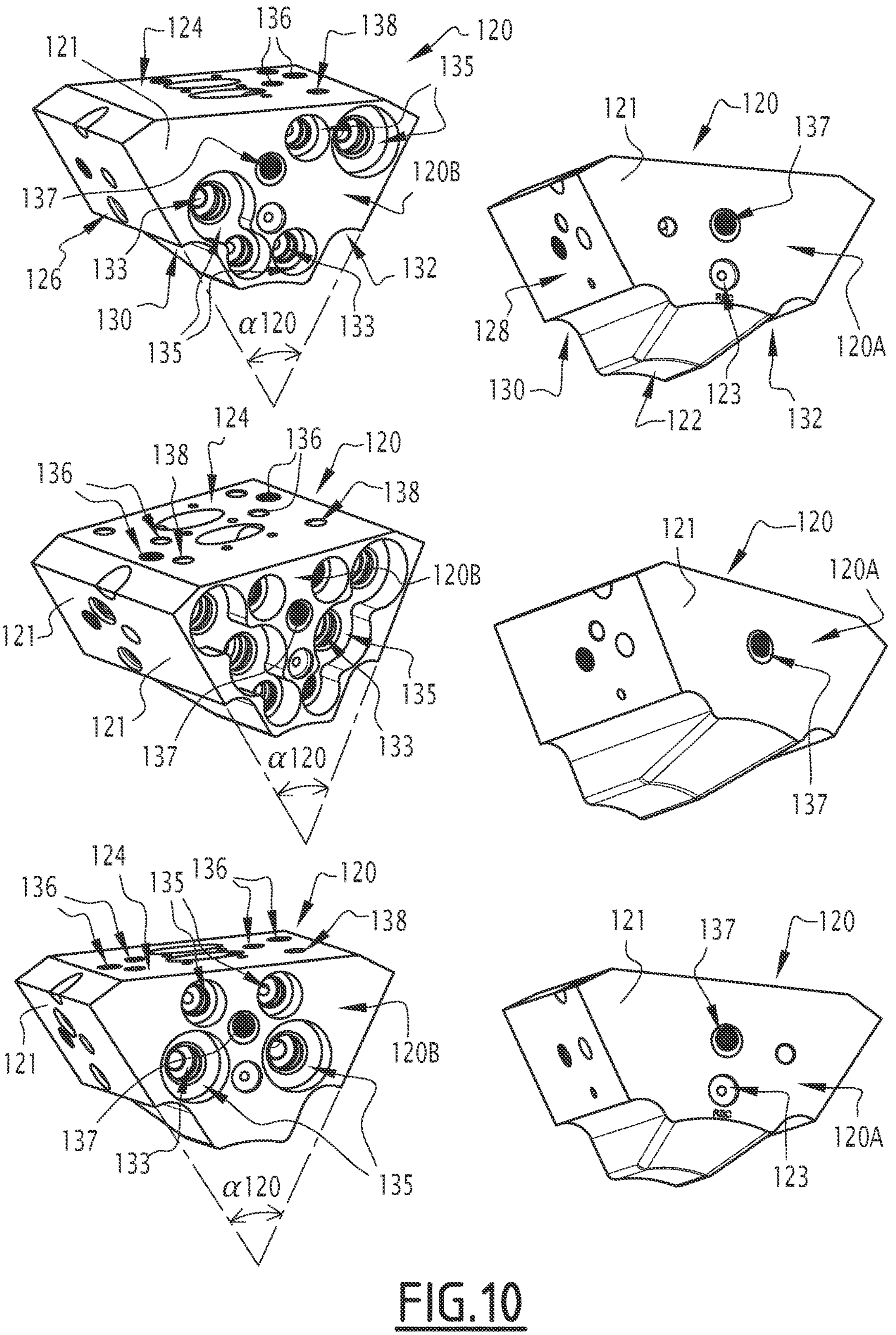
FIG. 10 shows, on a smaller scale, three connection modules which may be used in the feeding device shown in FIGS. 4-6, each connection module being shown in a perspective view from two different angles.
Figure 11:
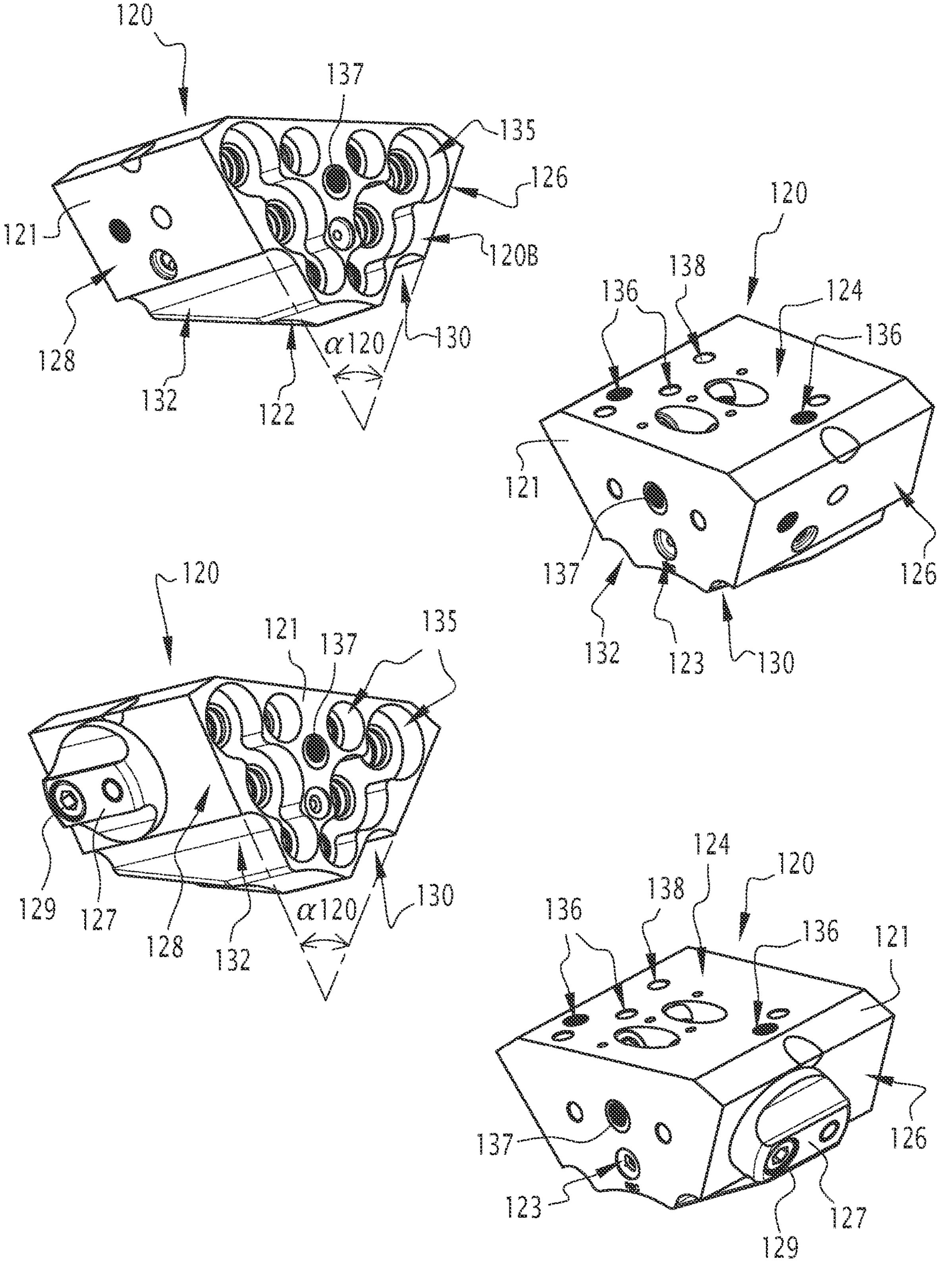
FIG. 11 shows, on the same scale as FIG. 10, two other connection modules which may be used in the feeding device shown in FIGS. 4-6, each connection module being shown in a perspective view from two different angles.

As can be seen from FIGS. 10 and 11, connection modules 120 may be of different types. Each connection module 120 includes a body 121 which may be made, in general, of synthetic material, e.g., a polyoxymethylene plastic, preferentially in copolymer form such as POMC, or of metal, in particular stainless steel, in certain cases. Each connection module 120 defines one or a plurality of circulation conduits for fluids. Such conduit may be a conduit for the circulation of a coating product, a conduit for the circulation of a cleaning product or a conduit for the circulation of control air. The various conduits are arranged so as to be fluidically connected to fluidic components, e.g. valves belonging to function modules 140, function modules 140 thus making it possible to control the distribution of coating product, cleaning product or control air. The different conduits of connection modules 120 may be further used for creating a pneumatic control circuit C138.

Feeding device 10 includes a plurality of function modules 140 which are each mounted on outer face 124 of a connection module 120.

Advantageously, function modules 140 are arranged so as to form a circuit minimizing dead zones, i.e., sections of pipes which are connected to the circulation circuit of the product, but which are situated outside the flow. Such dead zones, also called "glove fingers", are filled with product when the system is fed, and have to be cleaned when the system is drained, which represents a loss of coating product. The valves of function modules 140 are thus arranged and controlled so as to limit the presence of dead zones in the circuit.

In this way it is possible to optimize the material balances, hence the product losses during a change of product, and to improve the performance during rinses, in terms of quantity of product consumed and of time.

Figure 5:
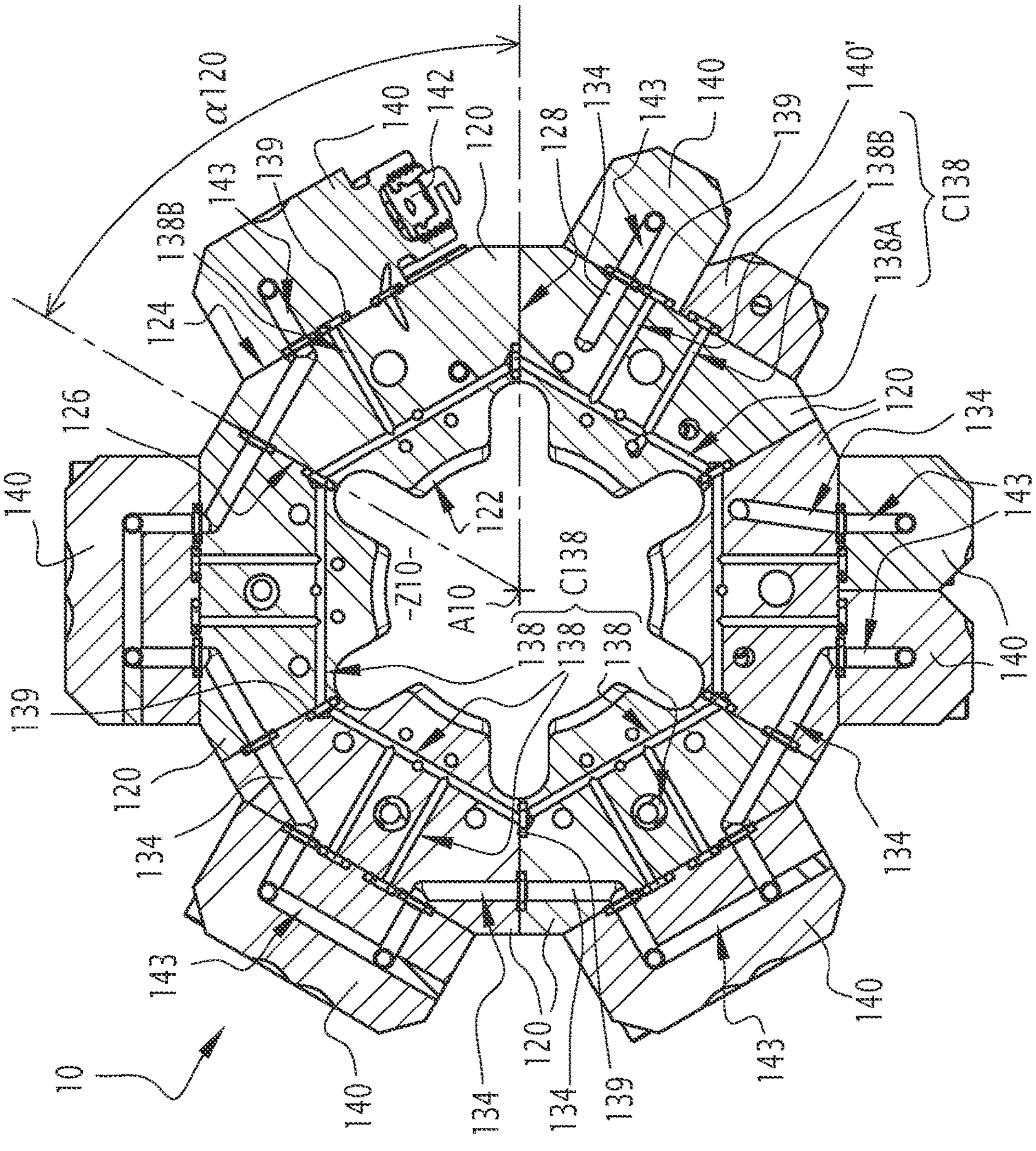
FIG. 5 is a section along plane P5 shown in FIG. 4.

As may be seen from FIG. 5, body 121 of each connection module 120 includes one or a plurality of circulation conduits 134 for coating product or cleaning product. The geometry and location of ducts 134 varies from one type of connection module 120 to another, depending on the type of function module which is mounted on the outer face 124 thereof. In other words, the geometry of body 121 of the different connection modules 120 varies according to the type of each connection module, which depends on the type of function module associated therewith.

Figure 9:
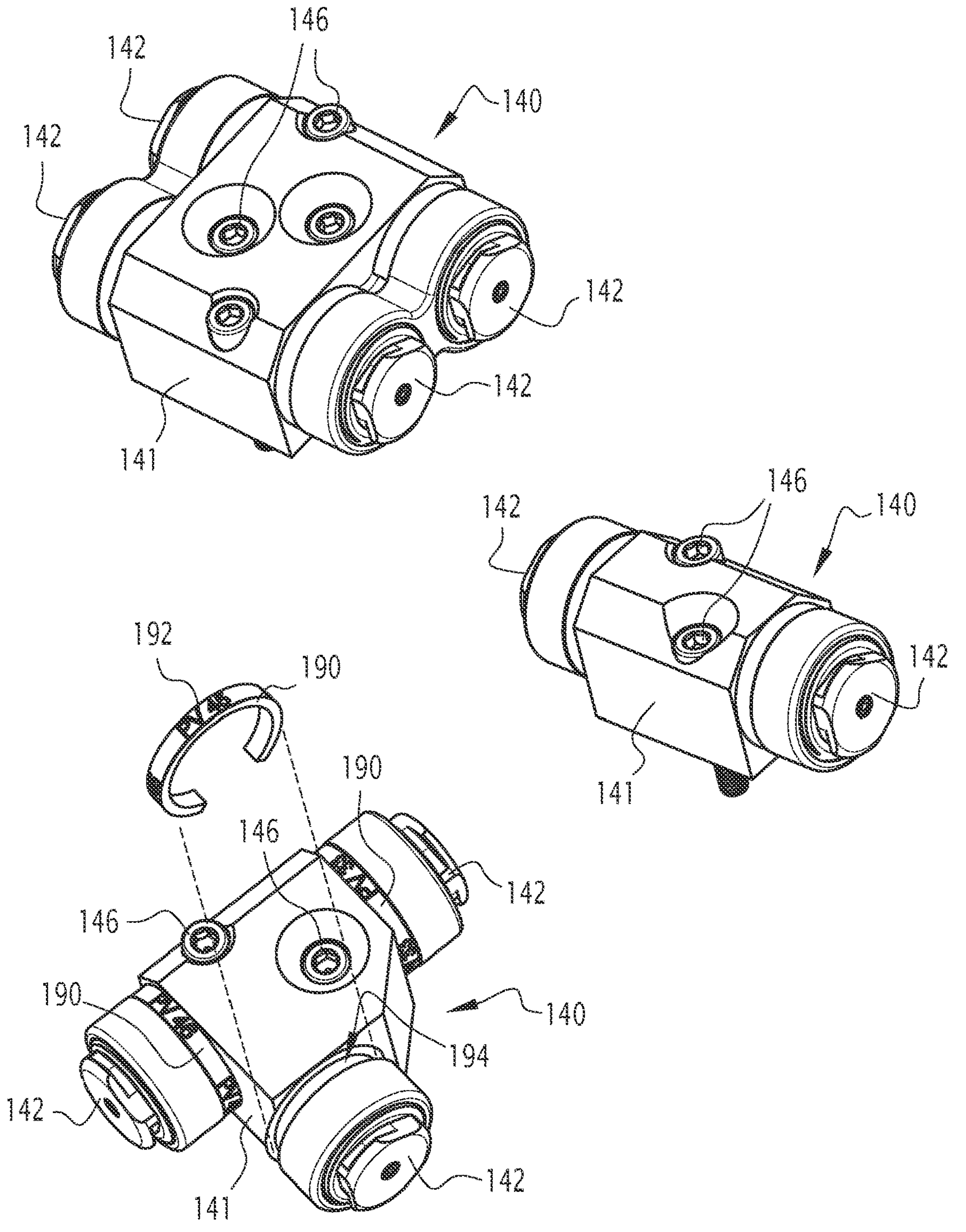
FIG. 9 shows three perspective views of function modules belonging to the feeding device shown in FIGS. 4-6, each function module being seen from two different angles.

Three types of function module are shown in FIG. 9.

Function module 140 of a first type shown in the upper part of FIG. 9 is a function module which includes four pneumatic valves 142, which makes it possible to feed a dispensing a coating product conduit 143, visible in FIG. 5 and forming a common collector, from four different coating products, e.g., four paints of different colors.

Function module 140 includes a body 141 which is, in the general case, made of a synthetic material, e.g., a polyoxymethylene plastic, preferentially in copolymer form such as POMC, or of metal, in particular stainless steel in certain cases. Valves 142 are received in body 141 which defines conduit 143. Four screws 146 cross right through body 141 and are intended to be screwed into corresponding tapped inserts 136 which open onto outer face 124 of a connection module 120 suitable for receiving function module 140. Tapped inserts 136 are made of an electrically conducting material, e.g., steel or brass.

Function module 140 of a second type represented in the middle part of FIG. 9 includes two valves 142 mounted in body 141 thereof which defines an internal conduit 143 and which is configured for being attached to a connection module 120, by means of two screws 146 screwed into corresponding tapped inserts 136 of the connection module.

Function module 140 of a third type shown in the lower part of FIG. 9 includes three valves 142 mounted on a body 141 which defines an internal conduit 143 and which carries two mounting screws 146 on outer face 124 of a connection module 120, the outer face being equipped with tapped inserts 136 suitable for receiving screws 146.

In a variant, a function module 140 may include a plurality of internal ducts 143.

Other function modules may be envisaged, with different geometries and/or numbers of valves. A function module, e.g. with a single conduit, may be used instead of one of the modules shown in FIG. 9. In such case, the body of the function module is advantageously electrically conducting, which makes it possible to bring the conduit that same defines to a defined electrical potential, e.g. to ground, by connecting the body to an object at the potential.

The geometry of body 141 of the different function modules 140 is variable depending on the type of each function module.

Screws 146 are made of metal and are hence electrically conducting. The screws may be used for immobilizing, in a reversible manner, function modules 140 on connection modules 120, more particularly on outer faces 124 thereof. The electrically conducting character of threaded inserts 136 and of screws 146 provides electrical continuity between connection modules 120 and function modules 140.

Figure 6:
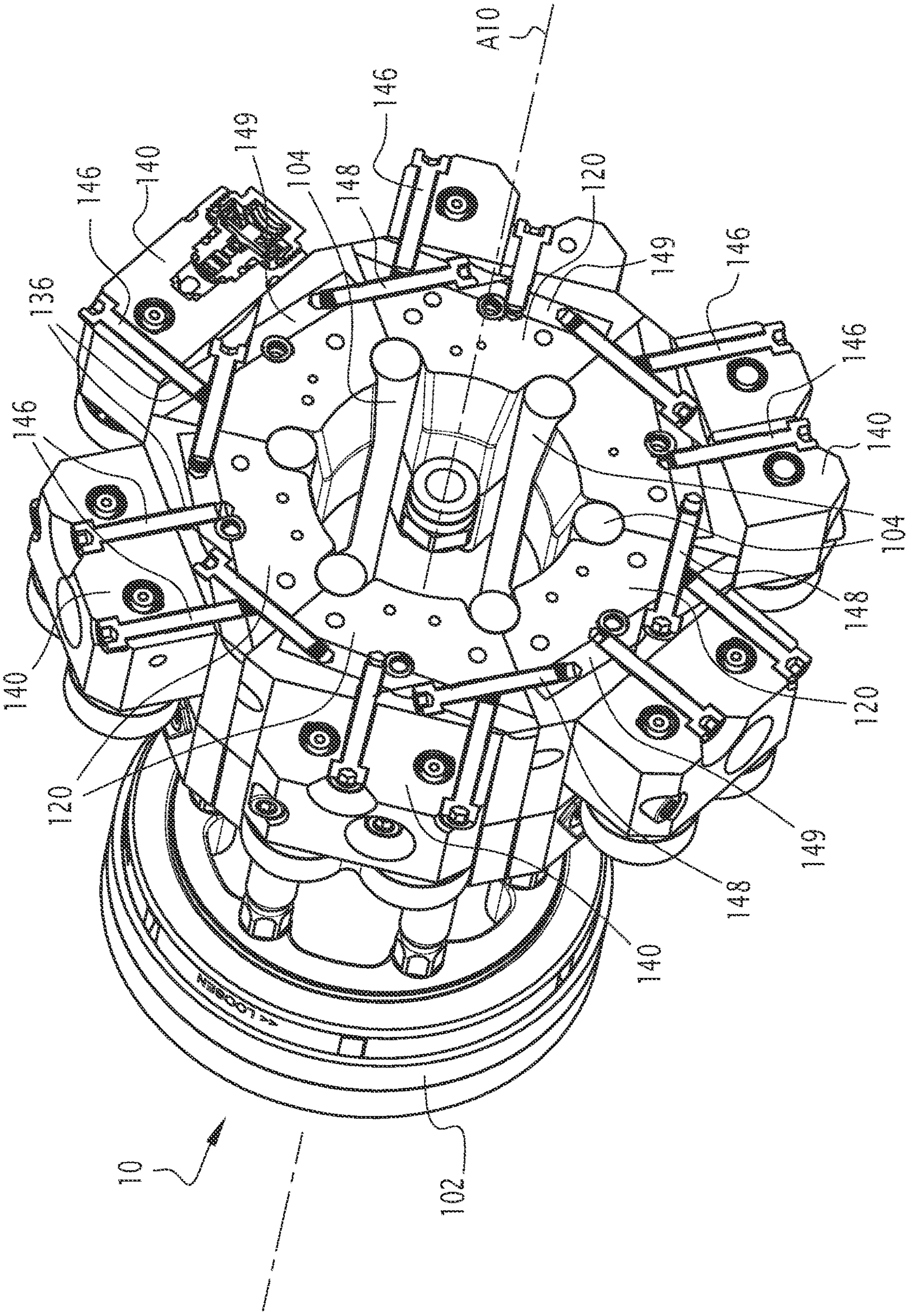
FIG. 6 is a perspective section along the plane P6 shown in FIG. 4.

As shown in FIG. 6, the two screws 146 used to removably immobilize a function block 140 on the associated connection block 120 have the same length, but with different implantation depths. The above is a fool proof means for positioning each terminal block 140 on connection block 120 on outer face 124 of which same is to be mounted.

As may be seen from FIGS. 2-6, two function modules 140 of the type shown in the middle part of FIG. 9 may be mounted side by side on outer face 124 of the same connection module 120.

Figure 4:
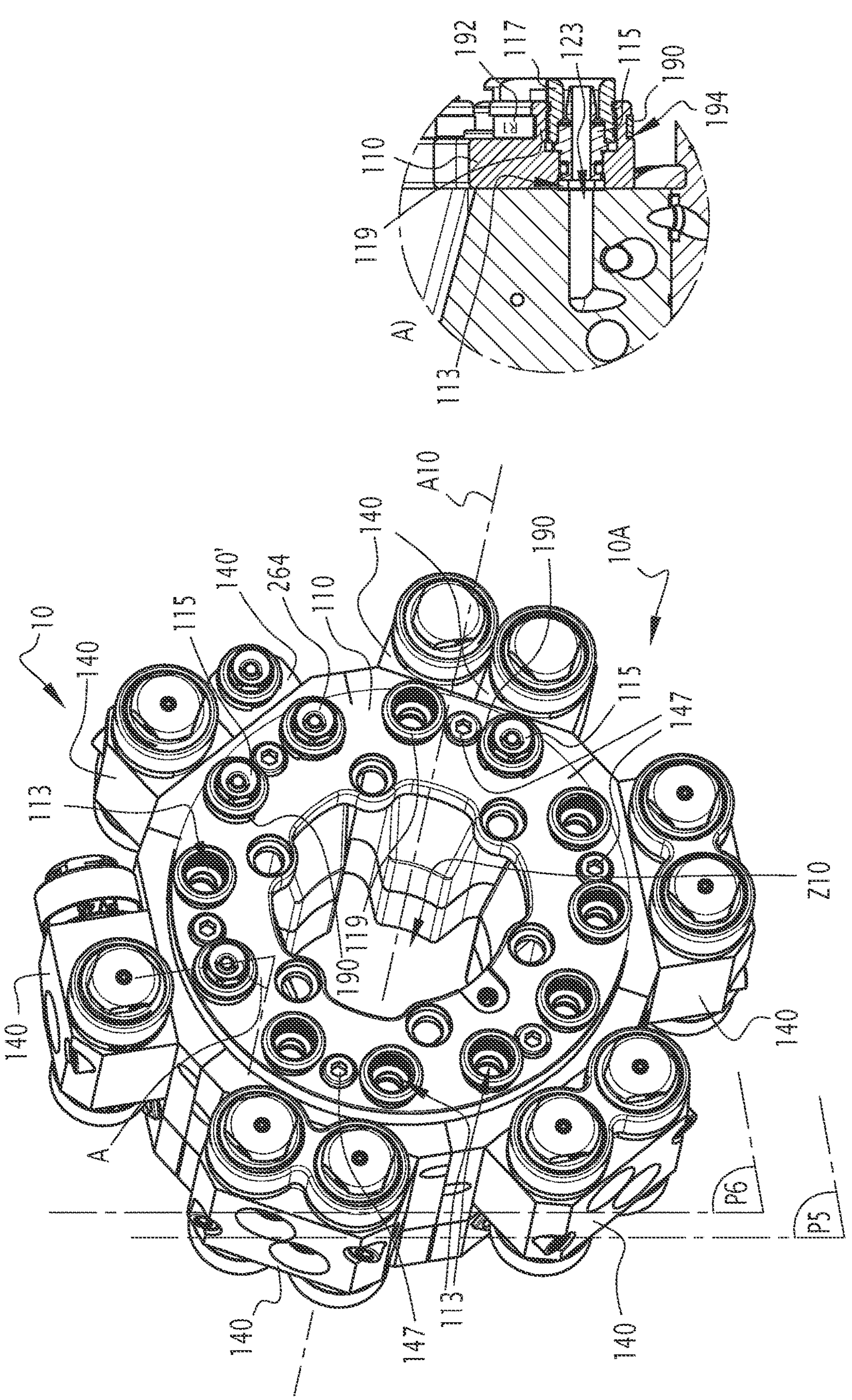
FIG. 4 is a perspective view of a feeding device according to the invention belonging to the installation shown in FIGS. 1-3.

As can be seen in the upper right-hand quadrant of FIG. 4 and in the lower right-hand quadrant of FIG. 5, it is also possible to mount, on outer face 124 of one or more connection modules 120, a first function module 140 of the type shown in the middle part of FIG. 9 and a second function module 140' which makes it possible to raise to a given electrical potential, namely the potential of annular plate 10, the fluid flowing through wrist 62 of robot 6 towards the sprayer. The second function module 140' may be used for connecting a hose to inlet module 150 mounted on the same connection module 120, without having a hose free at the first function module 140. The second function module 140' may also be a module for cleaning certain components of sprayer 8, such as bowl 84, which makes it possible to inject a stream of air and of solvent, and drying air into the member(s). In such case, the second function module 140' makes it possible to dissociate the cleaning and the drying of a rear part, formed by feeding device 10, from the cleaning and the drying of a front part, formed by sprayer 8. The cleaning and the drying operations may thus be carried out in parallel, which saves time.

On the other hand, as may be seen in FIG. 5, portions of conduit 138 are provided in the different connection blocks 120 and together form a pneumatic circulation circuit C138 for air, which is used for checking the proper tightening and the proper positioning of the different connection modules 120 with respect to each other. Circuit C138 includes a closed loop 138A which runs through each connection module 120 and which consists of portions of conduits 138 that extend between lateral faces 126 and 128 of connection modules 120. Circuit C138 also includes branches 138, formed by portions of conduit 138, which connect loop 138A to the different function modules 140 and which open onto outer faces 124 of connection modules 120. The outlets of conduit sections 138 on the outer and lateral faces 124, 126 and 128 are surrounded by seals 139. Seals 139 isolate circuit C138 from the outside. It is thereby possible, when connection modules 120 are mounted on plate 110 and function modules 140 are mounted on the connection modules, to pressurize circuit C138 so as to detect any leakage which would correspond to an imperfect fitting of at least one of connection modules 120 or of function modules 140. On the other hand, if no leak is detected, it may be assumed that connection modules 120 and function modules 140 are correctly mounted with respect to each other.

The different connection blocks 120 are immobilized on annular plate 110 by means of metal screws 147 which cross right through plate 110, between front side 110A thereof and rear side 110B thereof and are screwed into tapped holes 137 which open out onto front face 120A of each of connection modules 120. The mounting of connection modules 120 on plate 110 is thus reversible or removable; i.e., the connection modules may be removed from the plate if need be.

As may be seen in particular in FIG. 7, tapped holes 137 are formed by metal inserts which cross through each module 120 from front face 120A thereof to rear face 120B thereof. Thus, tapped holes 137 also open out onto rear faces 120B of connection modules 120.

Taking into account the electrically conducting character of plate 110, of screws 147 and of inserts 137, mounting of connection modules 120 onto plate 110 makes it possible to provide electrical continuity for the elements, in particular to ground connection modules 120, when plate 110 is itself grounded.

Figure 8:
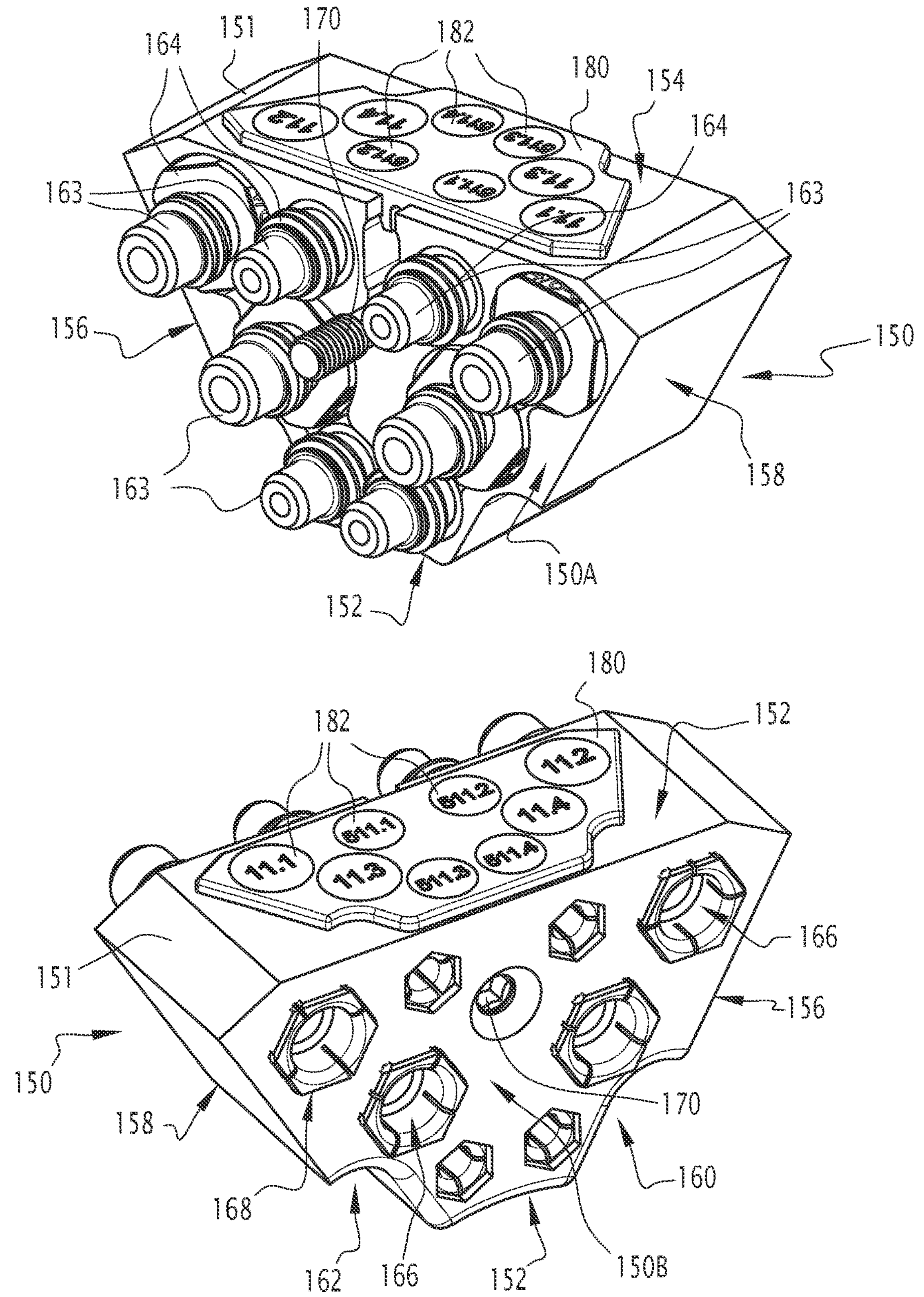
FIG. 8 shows two perspective views, from two different angles of an inlet module belonging to the feeding device shown in FIGS. 4-6.

Feeding device 10 further includes inlet modules 150, one of which is shown in perspective from two different angles in FIG. 8.

Each inlet module 150 includes a body 151 which is, in the general case, made of a synthetic material, e.g. a polyoxymethylene plastic, preferentially in copolymer form such as POMC, or of metal, in particular stainless steel in certain cases. Each inlet module 150 has the shape of a cylinder with an overall trapezoidal base, with a cross-section similar to the cross-section of a connection module 120. Each inlet module 150 is defined between an inner face 152, an outer face 154 and two lateral faces 156 and 158. Notches 160 and 162 are defined in a manner comparable to notches 130 and 132 of connection modules 120 and make it possible to mount each inlet module 150 on tie bolts 104, as explained hereinabove with regard to connection modules 120.

Bodies 151 of all inlet modules 150 of feeding device 10 are identical, which is advantageous in terms of manufacture and maintenance. In other words, regardless of connection module 120 with which same cooperates, each inlet module 150 keeps the same basic structure.

Body 151 of each inlet module 150 is equipped with fluidic coupling elements 164, inlet 166 of which is arranged on rear face 150B of the corresponding inlet module. Thereby, each fluidic coupling 164 is accessible on rear face 150B of inlet module 150 on which same is mounted.

Seen from rear side 10B of feeding device 10, the different inlet modules 150 have the same geometry with ports 168, some of which are filled by inlets 166 of fluidic coupling elements 164.

Inlet module 150 shown in FIG. 8 is equipped with the maximum number of fluidic coupling elements 164 that body 151 thereof can support. However, the above is not mandatory and the upper part of FIG. 3 makes it possible to distinguish between ports 168 which are not occupied by coupling elements 164 and other ports which are occupied by such elements, in particular on inlet module 150 mounted on connection module 120 on which is also mounted a function module 140 with three valves 142, of the type of function module shown in the lower part of FIG. 9.

Coupling elements 164 may be of different types, in particular same may have different diameters, depending on the nature of the fluid flowing therethrough, such fluid possibly being a coating product, a cleaning product or air.

Metal screws 170 are provided for immobilizing, in a reversible manner, inlet modules 150, each bearing by front face 150A against rear face 120B of a connection module 120. Thereby, face 120B of a connection module is an inlet face letting fluids into the module.

Rear face 150B of an inlet module 150 is opposite front face 150A thereof.

Screws 170 are screwed into tapped holes 137 by the side thereof, which opens onto rear faces 120B of connection modules 120.

As may be seen in the upper part of FIG. 8, each coupling element 164 protrudes from front face 150A of inlet module 150 wherein same is mounted.

Accordingly, taking into account the number and the distribution of coupling elements 164 of inlet module 150 associated thereof, each connection module 120 includes, on rear face 120B thereof, one or a plurality of counterbores 135 which surround ports 133 for receiving male end-pieces 163 of coupling elements 164.

The number and the distribution of coupling elements 164 on each inlet module 150 are determined as a function of the number, the geometry and the distribution of the internal conduits of connection modules 120, in particular receiving ports 133. Thereby, starting from the same body 151, different inlet modules 150 are formed by mounting connection elements 164 thereon, depending on the different connection modules 120 of feeding device 10. In other words, the number and distribution of fluidic coupling elements 164, and hence of inlets 166, varies from one inlet module 150 to another and depends, in particular, on the connection module on which same is to be mounted.

When an inlet module 150 bears via front face 150A thereof against rear face 120B of a connection module 120, and when a function module 140 bears against outer face 124 of the same connection module 120, the connection module connects, i.e. fluidically couples, inlet module 150 and function module 140, by means of conduit(s) 134 thereof.

Feeding device 10 is modular in the sense that same includes as many connection modules 120 and inlet modules 150 as needed for mechanically supporting and fluidically feeding function modules 140 which are useful for the correct operation of sprayer 8.

Such number is equal to six in the example of FIGS. 1-13, but the number can be smaller, as explained hereinafter.

Advantageously, each inlet module 150 is equipped, on outer face 154 thereof which extends outer face 124 of the module 120 onto which same is attached, with a label 180 which bears indications 182 for identifying active inlets 166 of coupling elements 164. Given the positioning thereof on the exterior of the annular structure formed by the different inlet modules 150, labels 180 are easily accessible to an operator for identifying the way in which the operator has to connect each inlet module 150 to the fluid feeding pipes of feeding device 10, the pipes being represented, only in FIG. 3, by the axis lines CA thereof and conventionally consisting of tubes of flexible synthetic material which extend along the direction of feeding device 10, from wrist 62.

In a variant, only one of inlet modules 150 or some of same have a label 180.

Furthermore, as shown only in the lower part of FIG. 9 for simplicity, each of valves 142 of a function module 140 may be identified by means of a split identification ring 190 which bears a mark 192 identifying the valve and which is mounted in a groove 194 provided in the body of function module 140 and which surrounds the valve 142 considered. In the example shown in the lower part of FIG. 9, the three valves 142 are identified by the pneumatic valve number thereof or "PV", namely PV33, PV45 and PV46 by means of an identification ring 190. Identification ring 190 of pneumatic-valve PV45 is shown in exploded view with respect to the corresponding groove 194, whereas the other two identification rings 190 are shown in place on body 141 of function module 140. Rings 190 each form an identification label for a valve 142 or a conduit 143.

Of course, the use of identification rings can be transposed to the other function modules 140, in particular the modules shown in the upper and middle part of FIG. 9.

As can be seen in particular in FIG. 4, annular plate 110 is equipped with twelve through ports 113 each surrounded by a sleeve 119 integral with the rest of plate 110. Each connection module 120 is arranged facing a pair of two through ports 113. Depending on the type of connection module 120, front face 120A either can or cannot be equipped with an outlet port of a conduit 123 for feeding coating product or cleaning product to sprayer 8. The coating or cleaning product reaching such an outlet port, flows inside conduit 123, which is internal to connection module 120, coming from function module 140 mounted on the connection module.

A coupling 115 is immobilized by a screwed ring 117 in each through port 113 arranged facing an outlet port of a feeding conduit 123 of a connection module 120. Each coupling 115 is thus fed with a coating product and/or a cleaning product.

Thus, it is possible to connect to couplings 115 fitted to annular plate 110, supplementary couplings belonging to sprayer 8, for feeding the latter with a coating product and/or a cleaning product, according to the operating sequences provided for sprayer 8.

Thus, at least some of connection modules 120 have the function of connecting, i.e., to fluidically coupling a function module 140 with plate 110, more particularly with one or a plurality of couplings 115 of plate 110, by means of feeding conduits 123 thereof. Plate 110 thus forms an outlet part or a downstream part of feeding device 10.

As can be seen in FIG. 12, a plurality of connection modules 120 are provided with a feeding conduit 123. Thus, feeding device 10 comprises a plurality of feeding conduits 123 and as many couplings 115.

Since the coating product necessarily crosses through plate 110 which is grounded and which is conducting, the coating product is also grounded at the level.

To facilitate identification of couplings 115, and as shown only in FIG. 4 and insert A thereof, a split identification ring 190, which bears a mark 192 for identifying a coupling 115, is mounted in a groove 194 provided on the outside of sleeve 119 which surrounds the through port 113 wherein coupling 115 is mounted. Herein, the identification mark is the number of coupling 115, in the example R1. Each split ring 190 surrounds the coupling 115 that same identifies. An identification ring 190 is mounted around each sleeve 119 which surrounds a through port 113 wherein a coupling 115 is immobilized. Rings 190 each form an identification label for a coupling 115.

Identification rings 190 are mounted on function modules 140 and on annular plate 110 in a removable manner, by snap-fitting inside grooves 194, during the manufacture of feeding device 10. Depending on possible modifications of such device, the rings can be moved, removed or replaced.

In a variant, other types of labels can be used for identifying valves 142, conduits 123 or couplings 115. The removable mounting thereof on bodies 141 or on plate 110 may be performed by means other than a snap-fitting.

In the mounted configuration of feeding device 10, a central zone Z10 of feeding device 10, which is defined by plate 110 and which extends along axis A10 as far as modules 120 and 150, is left free by the annular structure of feeding device 10. Central zone Z10 may be used for running therethrough conduits feeding fluid, in particular control air, to sprayer 8, or connectors or power cables for the latter. The conduits and the power cables are represented only in FIG. 3, by the axis lines CA and CB, respectively.

In the example of the figures where sprayer 8 includes a high-voltage unit 9, a connector 200 may be mounted in zone Z10, as may be seen in FIG. 3 where only the outer shell of connector 200 is shown.

In a variant (not shown), if sprayer 8 does not have a high-voltage unit, one or a plurality of high-voltage power cables of the sprayer may run through central zone Z10 through part 86 of sprayer 8, so as to be connected directly to body 82.

As can be seen from FIGS. 6-12, screws 148 are inserted into connection modules 120 and protrude from at least one of the lateral faces thereof, in order to be screwed into an adjacent connection module 120. Metal inserts 149 are provided in the different connection modules 120 for receiving screws 148 of the adjacent connection modules, which provide, on the one hand, good mechanical anchoring of the connection modules to each other and about axis A10, i.e., a long-lasting assembly between two adjacent connection modules, and, on the other hand, electrical continuity between connection modules 120. Such electrical continuity is also achieved with function modules 140, screws 146 of which extend into inserts 149, as may be seen in FIG. 6.

Thereby, screws 146, 147, 148 and 170, and inserts 136, 137 and 149, together form an equipotential track between connection modules 120, function modules 140, inlet modules 150 and annular plate 110 which is made of conducting material. The grounding of the annular plate is thus transferred to modules 120, 140 and 150.

Figure 14:
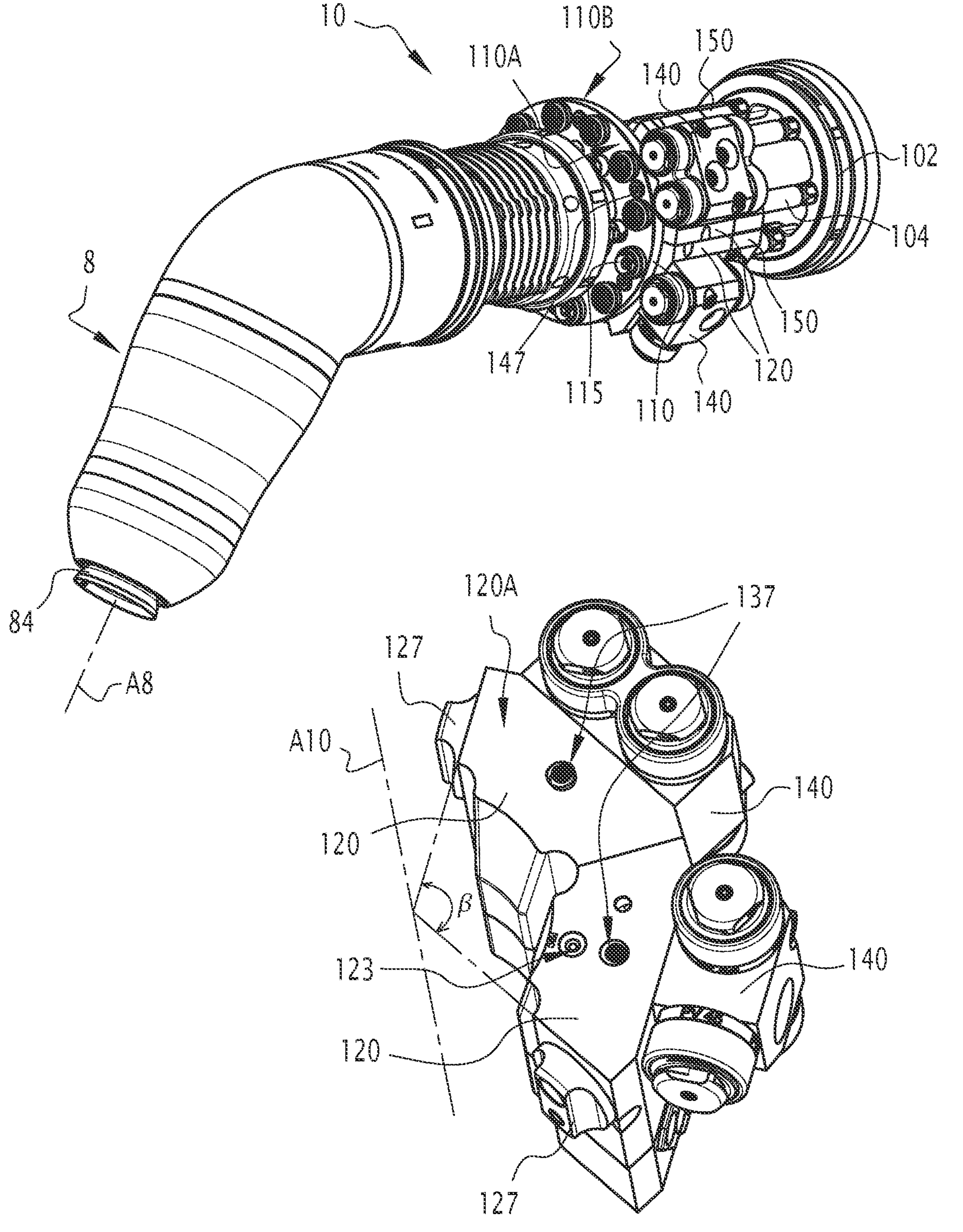
FIG. 14 shows a second embodiment of a feeding device and of an installation according to the invention, by means of a perspective view comparable to FIG. 2 and of a perspective view of a part of a feeding device.

In the second embodiment of the invention shown in FIG. 14, elements similar to the elements of the first embodiment bear the same references. If a reference is used in FIG. 14 without being mentioned in the description, the reference corresponds to the object bearing the same reference in the first embodiment. Conversely, if a reference is mentioned in the description without being shown in FIG. 14, the reference corresponds to the object bearing the same reference for the first embodiment. Hereinafter, is mainly described what distinguishes the second embodiment from the first embodiment.

In the second embodiment, feeding device 10 includes only two connection modules 120, two function modules 140 and two inlet modules 150 which are removably mounted by means of screws 147, side by side, on rear side 110B of annular plate 110.

In the second embodiment, the structure formed by modules 120, 140 and 150 does not extend over 360° about the axis A10, as in the first embodiment, but over an angle β equal to about 120°. In the example shown in FIG. 14, the two connection modules 120 are identical and they each bear a plug 127, which corresponds to the configuration of the module 120 shown in the lower part of FIG. 11.

As may be seen in FIG. 11, each plug 127 is removably immobilized on the corresponding connection module 120 by means of a screw 129 which is inserted in an insert 149, instead of one of screws 148 mentioned with regard to the first embodiment.

In the second embodiment, a single connection module 120 is provided with a feeding conduit 123. Thus, feeding device 10 includes a single feeding conduit 123 and a single coupling 115 mounted on plate 110.

In a variant, the number of connection modules 120 may be between 3 and 5, depending on the number of function modules 140 needed for operation of sprayer 8. In such case, the number of inlet modules 150 is adapted to the number of connection modules 120.

Whatever the embodiment and according to an aspect of the invention, which is not shown in the figures, a cover surrounds feeding device 10, between wrist 62 and body 82 of the sprayer, so as to protect the sprayer from being soiled during application of a coating product, in particular by paint backflows, sometimes called "oversprays".

As mentioned above, some of bodies 121, 141 and 151, in particular bodies 141 of function modules 140, may be made of an electrically conducting material, in particular of aluminum or stainless steel, or even of an electrically insulating material. The advantage of a body 141 of a function module 140 being made of conducting material lies in the ability thereof to transmit the electrical potential of the equipotential track formed by screws 146, 147, 148 and 170 and inserts 136, 137 and 149, connected to plate 110, to each of the conducting components included in function module 140, e.g., the fluidic components.

If the body 141 of a function module 140 is made of synthetic material, e.g., plastic material, same advantageously includes metal inserts arranged to form an equipotential path between fluidic elements of function module 140 and screws 146 arranged to be attached in the inserts 149.

In summary, it is plate 110 which allows all fluids which feed sprayer 8, to be brought to the same potential, here to the ground. Bodies 121, 141 and 151 of modules 120, 140 and 150 may be made of electrically conducting or electrically insulating materials, in particular metallic materials. If such materials are electrically insulating, the inserts make it possible to produce an equipotential of all metal parts with each other and with plate 10, which prevents the attachment screws from being at a floating potential. If such materials are electrically conducting, the equipotential takes place without requiring the use of inserts. The choice of materials for bodies 121, 141 and 151 depends on the nature of the fluid or fluids to be conveyed, e.g., if it involves a two-component coating product, and/or on the possible complexity of installing the inserts in the case of electrically insulating materials.

The invention is applicable with an electrostatic or a non-electrostatic type sprayer, whether equipped or not with a rotating bowl.

The invention is shown in the figures in the case where each connection module 120 and each inlet module 150 extends over an angular sector, the apex angle a120 of which, taken about axis A10, is equal to 60°. In a variant, the angle may be different, e.g., equal to 45°, in which case the maximum number of connection modules 120 is eight. Other values of the apex angle and of the number of connection modules may be envisaged.

The invention is shown in the figures in the case where sprayer 8 is used for applying a coating product to a motor vehicle body C. The invention is also applicable where the sprayer is used for applying a coating product to a vehicle component, such as a bumper or a rim, to a housing of a household product or to any other object to be coated.

The aforementioned embodiments and variants may be combined so as to generate new embodiments of the invention.

The invention claimed is:

1. A feeding device, for feeding a coating and/or a cleaning product to a sprayer, comprising:

at least one pilot-operated valve;

a circulation conduit for bringing product to said at least one pilot-operated valve;

at least one feeding conduit for feeding the sprayer from said at least one pilot-operated valve;

an annular plate equipped with through ports;

a plurality of connection modules, each connection module being removably mounted, in contact by means of a contact face, against one side of said annular plate, and each connection module comprising at least one inlet circulation conduit for bringing product to said at least one pilot-operated valve;

a plurality of function modules, each function module (i) being removably mounted on an outer face of one of said plurality of connection modules distinct from the face of contact thereof with said annular plate, (ii) being fluidly coupled to one of said at least one circulation conduit of that connection module, and (iii) comprising either at least one second pilot-operated valve and at least one internal conduit, or a conduit section intended for being grounded; and a plurality of inlet modules, each inlet module (i) being removably mounted on an inlet face of one of said plurality of connection modules opposite the contact face thereof, and (ii) bearing fluid-coupling elements accessible on a face of the inlet module, oriented opposite that connection module.

2. The feeding device according to claim 1, wherein bodies of said plurality of inlet modules, which are equipped with the fluid-coupling elements, are identical to one another.

3. The feeding device according to claim 1, wherein at least one of said plurality of inlet modules comprises a label which bears marks for identifying the fluid-coupling elements thereof.

4. The feeding device according to claim 3, wherein said label is affixed to one face of one of the inlet modules which extends the outer face of that connection module onto the inlet face of which the inlet module is mounted.

5. The feeding device according to claim 1, wherein at least one of said function modules, and/or said annular plate comprises a label for identifying valves, circulation conduits or couplings, the label being removably mounted on a fixed part of the function module and/or said annular plate.

6. The feeding device according to claim 1, wherein each of said connection modules bears at least one of said plurality of function modules on the outer face thereof and a single inlet module of said plurality of inlet modules on the inlet face thereof.

7. The feeding device according to claim 1, wherein said plurality of connection modules defines an annular structure or a ring-portion structure, within which extends a control circuit which passes through each connection module.

8. The feeding device according to claim 1, further comprising parallel bars which support said annular plate, and wherein each connection module and/or each inlet module bears onto a pair of two adjacent parallel bars.

9. The feeding device according to claim 1, wherein said annular plate comprises electrically conducting material, and each connection module comprises at least one threaded insert comprising electrically conducting material, each threaded insert receiving a screw for mounting (i) one of said connection modules onto said annular plate and/or onto an adjacent connection module, (ii) one of said function modules onto one of said connection modules, or (iii) one of said inlet modules onto one of said connection modules, and wherein the screws and the threaded inserts together form an equipotential path between said connection modules, said function modules, said inlet modules and said annular plate.

10. A connection module forming a spare part for the feeding device according to claim 1, comprising:

a contact face to bear, in a removable manner, against one side of said annular plate;

an outer face, distinct from said contact face, for removably receiving at least one function module; and an inlet face opposite said contact face for removably receiving one of said inlet modules.

11. A function module forming a spare part for the feeding device according to claim 1, comprising:

at least one second pilot-operated valve;

at least one internal conduit; and means for removably mounting on an outer face of one of said connection modules.

12. An inlet module forming a spare part for the feeding device according to claim 1, comprising:

a first face intended for bearing, in a removable manner, against one of the inlet faces of one of said connection modules; and a second face, opposite said first face and through which inlets of fluid-coupling elements borne by the inlet module are accessible.

13. An application installation for applying a coating product, comprising:

a robot; and a sprayer mounted on an arm of said robot and fed with a coating product and/or a cleaning product by the feeding device according to claim 1.

14. The application installation according to claim 13, wherein air supply lines for the control of pneumatic valves, a connector and/or power cables for supplying said sprayer with high voltage, pass through or are housed in a central zone of the feeding device defined in said annular plate.

* * * * *